United States Patent
Liu

(10) Patent No.: US 11,457,479 B2
(45) Date of Patent: Sep. 27, 2022

(54) METHOD AND APPARATUS FOR CONFIGURING RANDOM ACCESS OCCASION, METHOD AND APPARATUS FOR RANDOM ACCESS

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co. Ltd., Beijing (CN)

( * ) Notice: Subject to any disclaimer, the term of this patent is extended or adjusted under 35 U.S.C. 154(b) by 213 days.

(21) Appl. No.: 16/990,156

(22) Filed: Aug. 11, 2020

(65) Prior Publication Data

US 2020/0374939 A1 Nov. 26, 2020

Related U.S. Application Data

(63) Continuation of application No. PCT/CN2018/076545, filed on Feb. 12, 2018.

(51) Int. Cl.
| | |
|---|---|
| *H04W 74/08* | (2009.01) |
| *H04W 56/00* | (2009.01) |
| *H04W 74/00* | (2009.01) |

(52) U.S. Cl.
CPC ..... *H04W 74/0833* (2013.01); *H04W 56/001* (2013.01); *H04W 74/006* (2013.01); *H04W 74/008* (2013.01)

(58) Field of Classification Search
CPC ............. H04W 56/001; H04W 74/006; H04W 74/008; H04W 74/0833
See application file for complete search history.

(56) References Cited

U.S. PATENT DOCUMENTS

| | | | |
|---|---|---|---|
| 2014/0153517 A1 | 6/2014 | Chen et al. | |
| 2017/0251460 A1 | 8/2017 | Agiwal et al. | |
| 2019/0306892 A1* | 10/2019 | Xiong | H04W 56/001 |
| 2019/0387546 A1* | 12/2019 | Li | H04L 27/26025 |
| 2020/0059878 A1* | 2/2020 | Huang | H04W 56/001 |

(Continued)

FOREIGN PATENT DOCUMENTS

CN 102869113 A 1/2013

OTHER PUBLICATIONS

International Search Report of International Application No. PCT/CN2018/076545 dated Oct. 26, 2018, (4p).

(Continued)

*Primary Examiner* — Gary Mui
(74) *Attorney, Agent, or Firm* — Arch & Lake LLP

(57) ABSTRACT

A method for configuring random access occasion (RO), a method for random access, and a base station are provided. The method of configuring the RO includes: determining a current number of SSBs to be configured for sending and a number of ROs; sending the number of SSBs and the number of ROs to UE and dividing the number of ROs by the current number of SSBs to obtain a remainder number; determining whether the remainder number is greater than or equal to a target number according to a configuration rule, where the target number is determined based on the current number of SSBs; and in response to that the remainder number is greater than or equal to the target number, establishing one-to-one correspondences between the remainder number of ROs and the remainder number of SSBs.

20 Claims, 12 Drawing Sheets

(56) References Cited

U.S. PATENT DOCUMENTS

| | | | | |
|---|---|---|---|---|
| 2020/0154377 A1* | 5/2020 | Qian | ................... | H04L 5/0048 |
| 2020/0344810 A1* | 10/2020 | Xiong | ................... | H04L 1/1861 |
| 2021/0100038 A1* | 4/2021 | Ly | ................... | H04W 56/0015 |
| 2021/0127429 A1* | 4/2021 | Huang | ............. | H04W 74/0891 |
| 2021/0243811 A1* | 8/2021 | Nam | ................. | H04W 74/0833 |
| 2021/0274561 A1* | 9/2021 | Li | ................... | H04W 74/0891 |
| 2021/0298086 A1* | 9/2021 | Jiang | ................ | H04W 74/0833 |

OTHER PUBLICATIONS

Samsung, "Discussion on RACH Confirmation" 3GPP TSG RAN WG1 Meeting NR#3 R1-1715920, Nagoya, Japan, Sep. 12, 2017, (4p).

Huawei et al., "RACH Procedures and Resource Configuration" 3GPP TSG RAN WG1 Meeting #89, R1-1706976, Hangzhou, China, May 6, 2017, (7p).

* cited by examiner

METHOD AND APPARATUS FOR CONFIGURING RANDOM ACCESS OCCASION, METHOD AND APPARATUS FOR RANDOM ACCESS

CROSS REFERENCE TO RELATED APPLICATIONS

This application is a continuation of International application No. PCT/CN2018/076545, filed Feb. 12, 2018, the content of which is incorporated herein by reference.

TECHNICAL FIELD

The present disclosure relates to the field of communication technologies, and in particular, relates to: a method for configuring a random access occasion (RO), a method for random access, and a base station.

BACKGROUND

With the rapid development of wireless communication technology, the fifth generation mobile communication technology ($5^{th}$ Generation, referred to as 5G) has appeared. In the recent discussion of the $3^{rd}$ Generation Partnership Project (3GPP), a number of random access occasions (ROs) corresponding to a synchronization signaling block (SSB) can be a value between a fraction less than 1 (for example, ¼) and an integer greater than 1 (for example, 4), that is, one RO may correspond to multiple SSBs, while one SSB may correspond to multiple ROs. However, the number of ROs is not always divisible by the number of SSBs.

Sometimes, ROs are evenly allocated to SSBs, and a RO resource that does not correspond to any SSB is discarded. However, this method will cause a waste of the RO resource and affect the latency of random access since a RO corresponds to an access resource in a time domain, which is not conducive to meet an access requirement of a low-latency service.

SUMMARY

The present disclosure provides a method for configuring a RO, a method for random access, and a base station.

According to a first aspect of examples of the present disclosure, a method of configuring a RO is provided, which is applied in base station. The method may include: determining a current number of synchronization signaling blocks (SSBs) to be configured for sending and a number of ROs; sending the current number of SSBs and the number of ROs to user equipment (UE) and dividing the number of ROs by the current number of SSBs to obtain a remainder number; determining whether the remainder number is greater than or equal to a target number according to a configuration rule, where the target number is determined based on the current number of SSBs; and in response to that the remainder number is greater than or equal to the target number, establishing between the remainder number of ROs and the remainder number of SSBs.

According to a second aspect of examples of the present disclosure, a method of random access is provided, which is applied in UE. The method may include: receiving a current number of SSBs to be configured by a base station and a number of ROs, and dividing the number of ROs by the current number of SSBs to obtain a remainder number; determining whether the remainder number is greater than or equal to a target number according to a configuration rule, where the target number is determined based on the current number of SSBs; in response to that the remainder number is greater than or equal to the target number, using a RO of a one-to-one correspondence with an SSB as a RO enabled for random access; and performing random access based on the RO enabled for random access.

According to a third aspect of the examples of the present disclosure, there is provided a base station, which may include a processor; and a memory for storing instructions executable by the processor. The processor may be configured to: determine a current number of SSBs to be configured for sending and a number of ROs; send the current number of SSBs and the number of ROs to UE, and divide the number of ROs by the current number of SSBs to obtain a remainder number; determine whether the remainder number is greater than or equal to a target number according to a configuration rule, where the target number is determined based on the current number of SSBs; and in response to that the remainder number is greater than or equal to the target number, establish between the remainder number of ROs and the remainder number of SSBs.

It should be understood that the above general description and the following detailed description are only exemplary and explanatory, and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Examples will be described in detail here with the examples thereof expressed in accompany drawings. When the following descriptions involve the accompany drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure.

Figure 1:
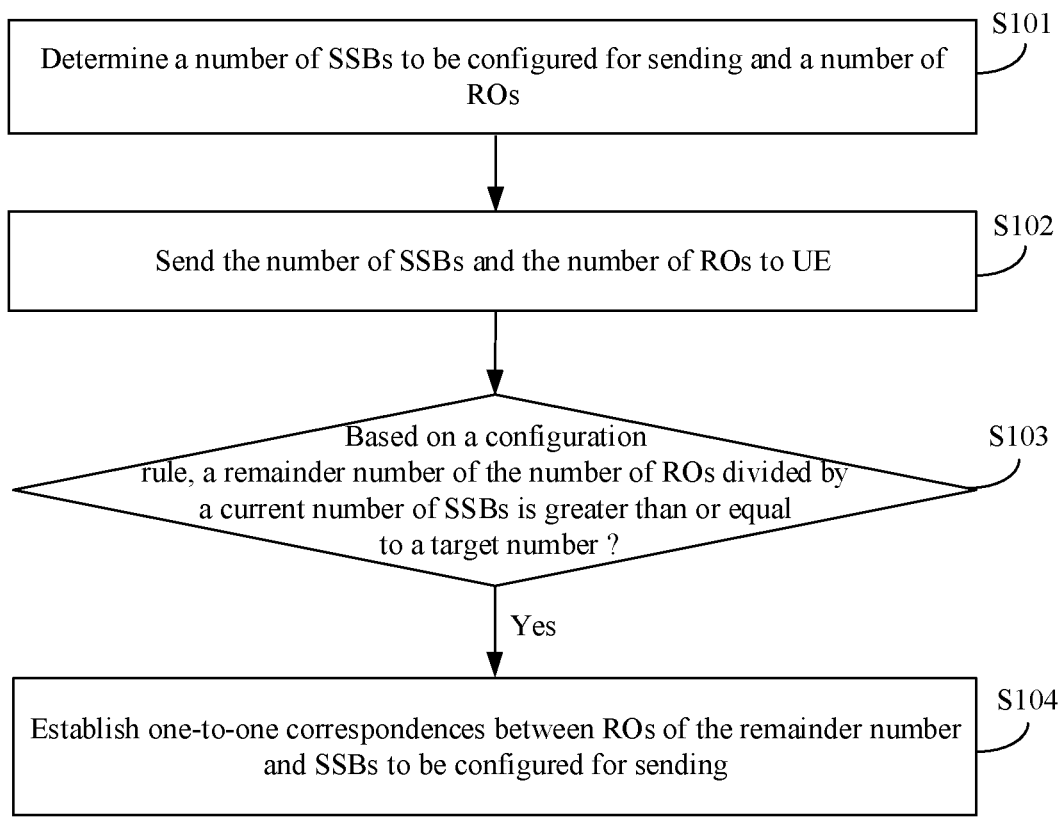
FIG. 1 is a flowchart illustrating a method of configuring a RO according to an example of the present disclosure.

FIG. 1 is a flowchart illustrating a method of configuring a RO according to an example of the present disclosure, which is described from a base station side. As shown in FIG. 1, the method of configuring a RO includes the followings.

At step S101, a number of SSBs to be configured for sending and a number of ROs are determined.

The SSB refers to a synchronization signal or physical broadcast channel block.

At step S102, the number of SSBs and the number of ROs are sent to user equipment (UE).

For UE in an initial access state, the base station may send the number of SSBs and the number of ROs to the UE through a common control resource set (CORESET) of remaining minimum system information (RMSI).

At step S103, whether a remainder number of the number of ROs divided by a current number of SSBs is greater than or equal to a target number is determined according to a configuration rule, where the target number is determined based on the current number of SSBs.

The configuration rule indicates that: when the remainder number is greater than or equal to the target number, the base station establishes one-to-one correspondences between ROs of the remainder number and SSBs to be configured for sending, and when the remainder number is less than the target number, the base station disables the ROs of the remainder number for random access but sends data through the ROs of the remainder number.

The target number may be determined based on the current number of SSBs. Optionally, the target number may be equal to half of the current number of SSBs.

At step S104, in response to that the remainder number is greater than or equal to the target number, one-to-one correspondences between ROs of the remainder number and SSBs to be configured for sending are established.

If the remainder number is greater than or equal to the target number, the one-to-one correspondences between the ROs of the remainder number and the SSBs to be configured for sending are established. Optionally, the correspondences between the ROs of the remainder number and the SSBs to be configured for sending may be established sequentially.

Assuming that the number of SSBs to be configured for sending is 10 and the number of ROs is 16, then the remainder number is 6. Since the remainder number is greater than the target number, one-to-one correspondences between the 6 ROs and the first 6 SSBs of the 10 SSBs may be established respectively, that is, the 6 ROs can be allocated to the first 6 SSBs of the 10 SSBs, respectively.

In this example, by establishing the one-to-one correspondences between ROs of the remainder number and SSBs to be configured for sending based on whether the remainder number of the number of ROs divided by the current number of SSBs is greater than or equal to the target number according to the configuration rule, the UE can use the RO of a one-to-one correspondence with an SSB as a RO enabled for random access, thereby reducing waste of a RO resource and latency of random access.

Figure 2:
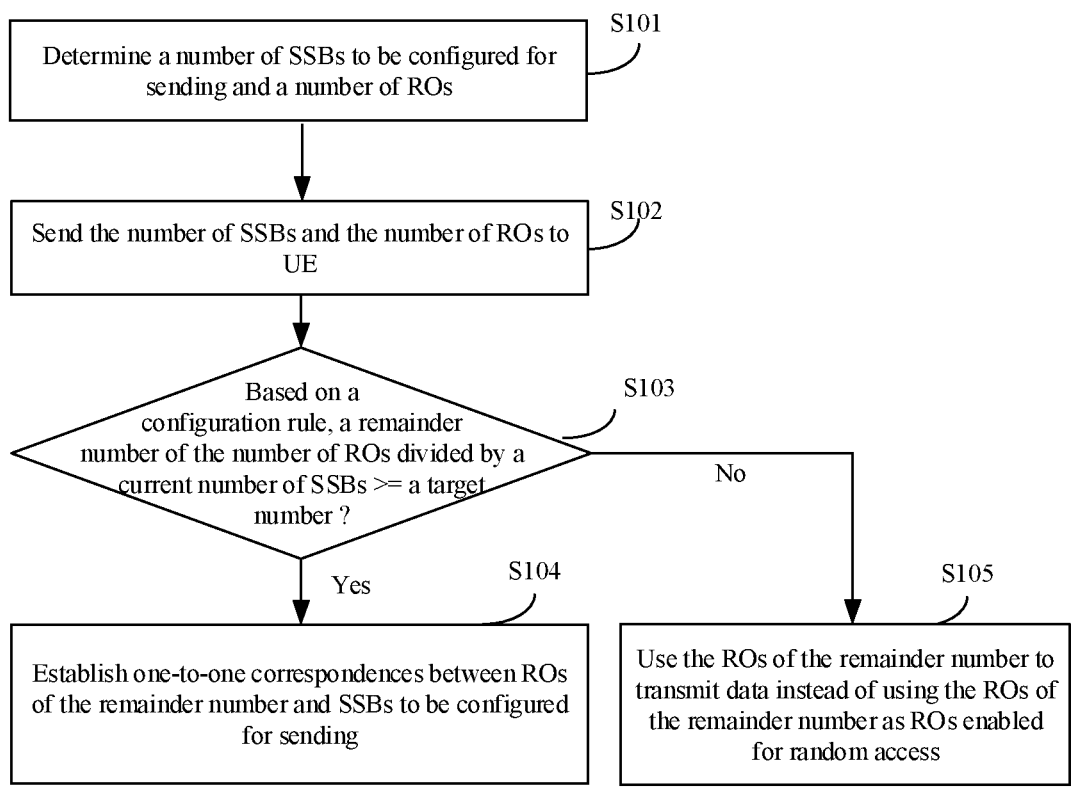
FIG. 2 is a flowchart illustrating another method of configuring a RO according to an example of the present disclosure.

FIG. 2 is a flowchart illustrating another method of configuring a RO according to an example of the present disclosure. As shown in FIG. 2, the method of configuring a RO may further include the following.

At step S105, in response to that the remainder number is less than the target number, the ROs of the remainder number are used to transmit data instead of using the ROs of the remainder number as ROs enabled for random access.

In this example, when the remainder number is less than the target number, instead of using the ROs of the remainder number as the ROs enabled for random access, the ROs of the remainder number are used to transmit data, thereby reducing waste of a RO resource and improving data transmission efficiency.

Figure 3:
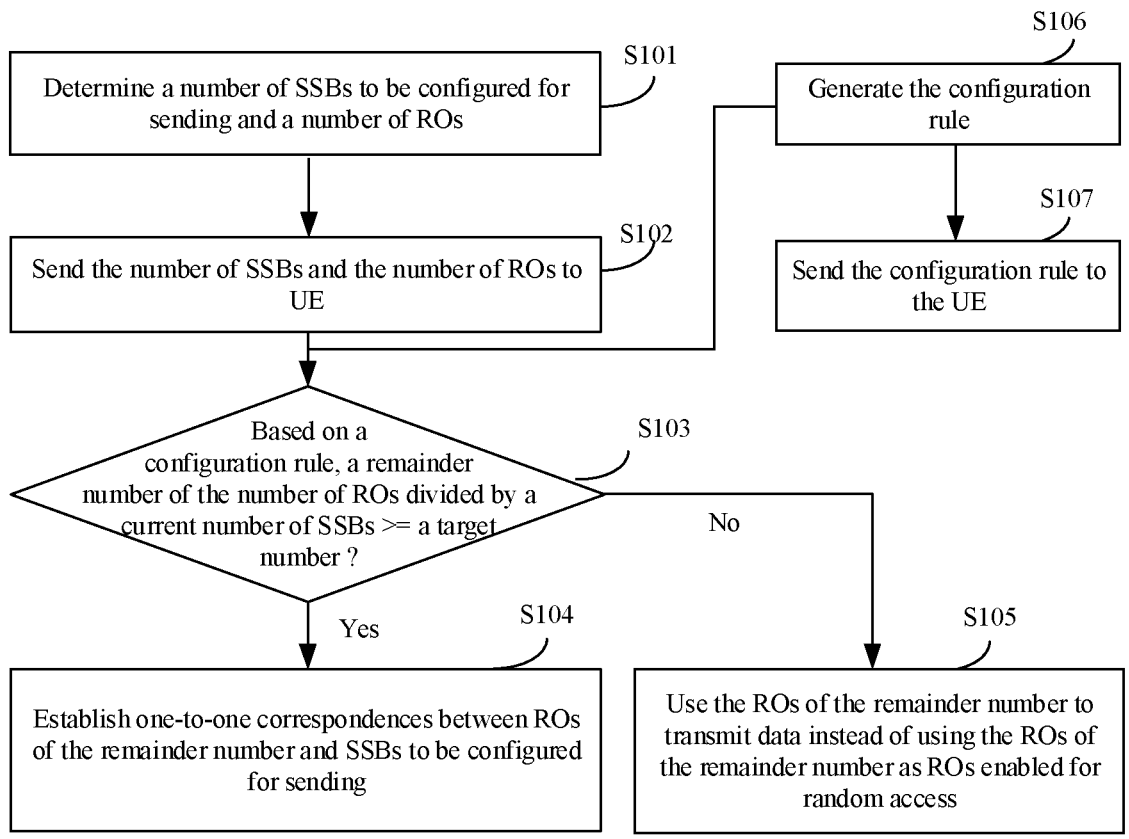
FIG. 3 is a flowchart illustrating another method of configuring a RO according to an example of the present disclosure.

FIG. 3 is a flowchart illustrating another method of configuring a RO according to an example of the present disclosure. As shown in FIG. 3, the method of configuring a RO may further include the followings.

At step S106, the configuration rule is generated to: when the remainder number is greater than or equal to the target number, establish the one-to-one correspondences between ROs of the remainder number and SSBs to be configured for sending; and when the remainder number is less than the target number, disable the ROs of the remainder number for random access but send data through the ROs of the remainder number.

At step S107, the configuration rule is sent to the UE.

In this example, by generating the configuration rule, the base station can determine whether the remainder number of the number of ROs divided by the current number of SSBs is greater than or equal to the target number according to the configuration rule, and determine whether the remaining number of ROs can be used for random access in response to a determination result. By sending the configuration rule to the UE, the UE can also determine whether the remainder number of the number of ROs divided by the current number of SSBs is greater than or equal to the target number according to the configuration rule, and determine whether the remaining number of ROs can be used for random access in response to a determination result.

Figure 4:
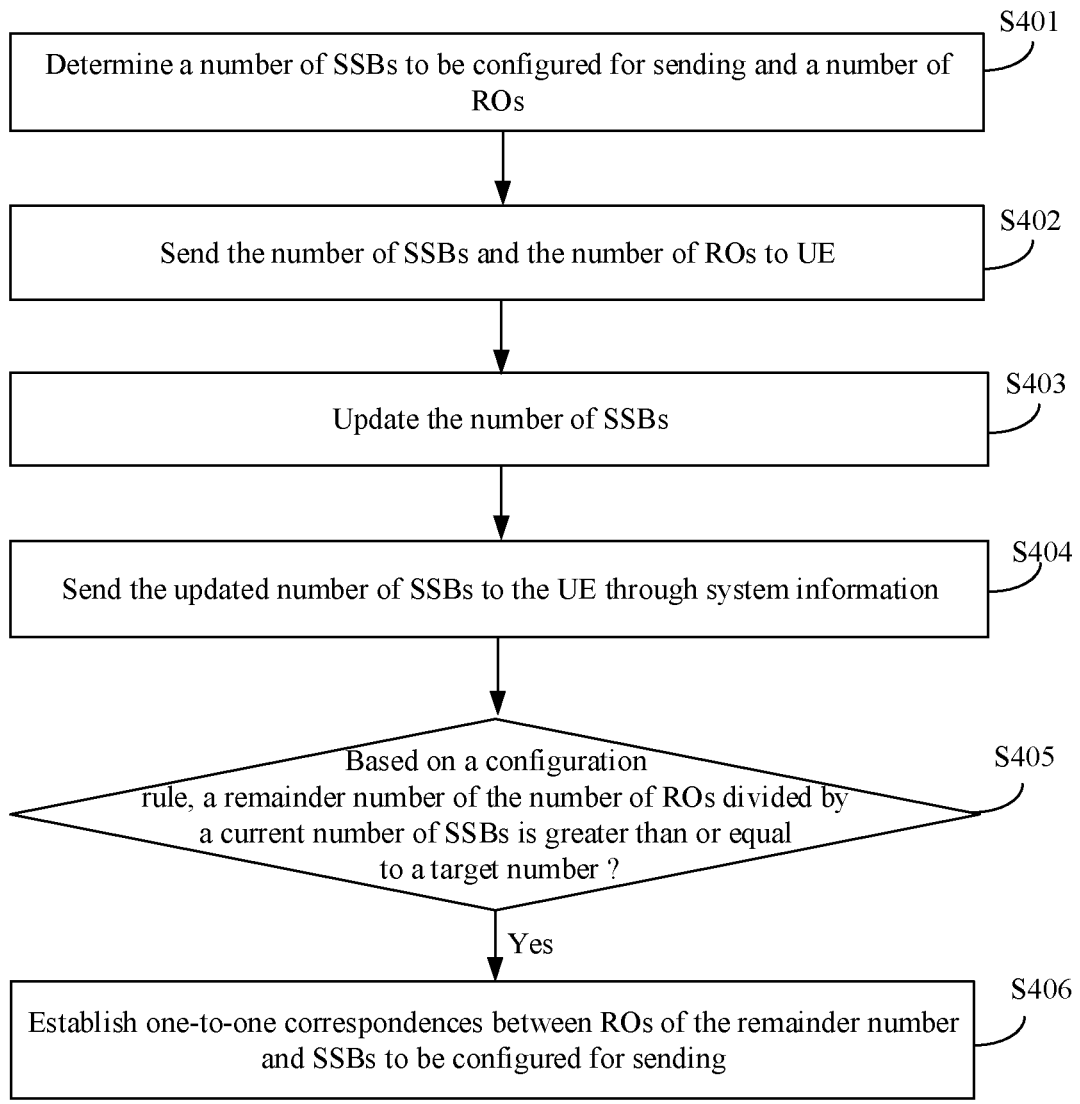
FIG. 4 is a flowchart illustrating another method of configuring a RO according to an example of the present disclosure.

FIG. 4 is a flowchart illustrating another method of configuring a RO according to an example of the present disclosure. As shown in FIG. 4, the method of configuring a RO may further include the followings.

At step S401, a number of SSBs to be configured for sending and a number of ROs are determined.

At step S402, the number of SSBs and the number of ROs are sent to the UE.

At step S403, the number of SSBs is updated.

At step S404, the updated number of SSBs is sent to the UE through system information.

The base station can update the number of SSBs to be configured for sending, and send the updated number of SSBs to the UE through the system information.

At step S405, whether a remainder number of the number of ROs divided by a current number of SSBs is greater than or equal to a target number is determined according to a configuration rule, where the target number is determined based on the current number of SSBs.

Optionally, the target number may be equal to half of the current number of SSBs.

At step S406, in response to that the remainder number is greater than or equal to the target number, one-to-one correspondences between ROs of the remainder number and SSBs to be configured for sending are established.

In this example, by updating the number of SSBs to be configured for sending, the base station can adjust the number of SSBs to be configured for sending as needed, and send the updated number of SSBs to the UE through the system information, such that the UE can be informed of the number of SSBs to be configured for sending by the base station.

Figure 5:
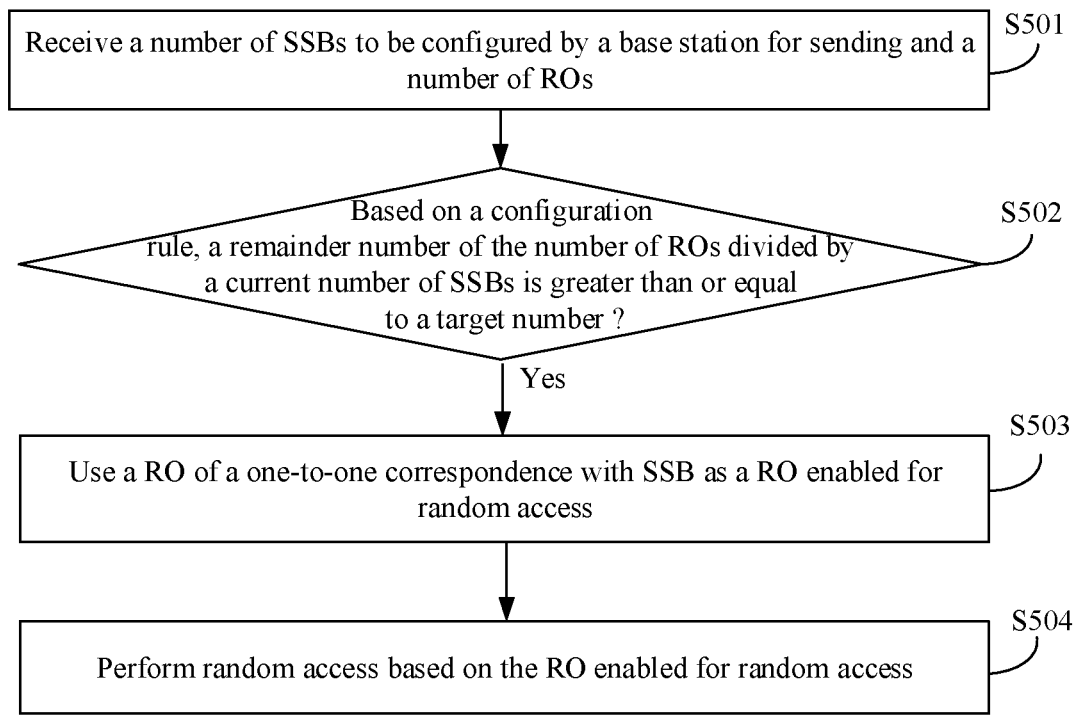
FIG. 5 is a flowchart illustrating a method of random access according to an example of the present disclosure.

FIG. 5 is a flowchart illustrating a method of random access according to an example of the present disclosure, which is described from a UE side. As shown in FIG. 5, the method of random access includes the followings.

At step S501, a number of SSBs to be configured by a base station for sending and a number of ROs are received.

The UE can receive the number of SSBs and the number of ROs from the base station through a CORESET of RMSI.

At step S502, whether a remainder number of the number of ROs divided by a current number of SSBs is greater than or equal to a target number is determined according to a configuration rule, where the target number is determined based on the current number of SSBs.

The target number may be determined based on the current number of SSBs. Optionally, the target number may be equal to half of the current number of SSBs.

At step S503, in response to that the remainder number is greater than or equal to the target number, a RO of a one-to-one correspondence with an SSB is used as a RO enabled for random access.

If the UE determines that the remainder number is greater than or equal to the target number, the RO of the one-to-one correspondence with the SSB is used as the RO enabled for random access, thereby reducing waste of a RO resource and latency of random access.

At step S504, random access is performed based on the RO enabled for random access.

In this example, after determining the RO enabled for random access, the UE may perform random access based on the determined RO.

In this example, whether the remainder number of the number of ROs divided by the current number of SSBs is greater than or equal to the target number is determined according to the configuration rule, and if the remainder number is greater than or equal to the target number, the RO of the one-to-one correspondence with the SSB is used as the RO enabled for random access, and random access is performed based on the RO enabled for random access. Thus, the waste of the RO resource and the latency of random access are reduced, which is conducive to meeting an access requirement of a low-latency service.

Figure 6:
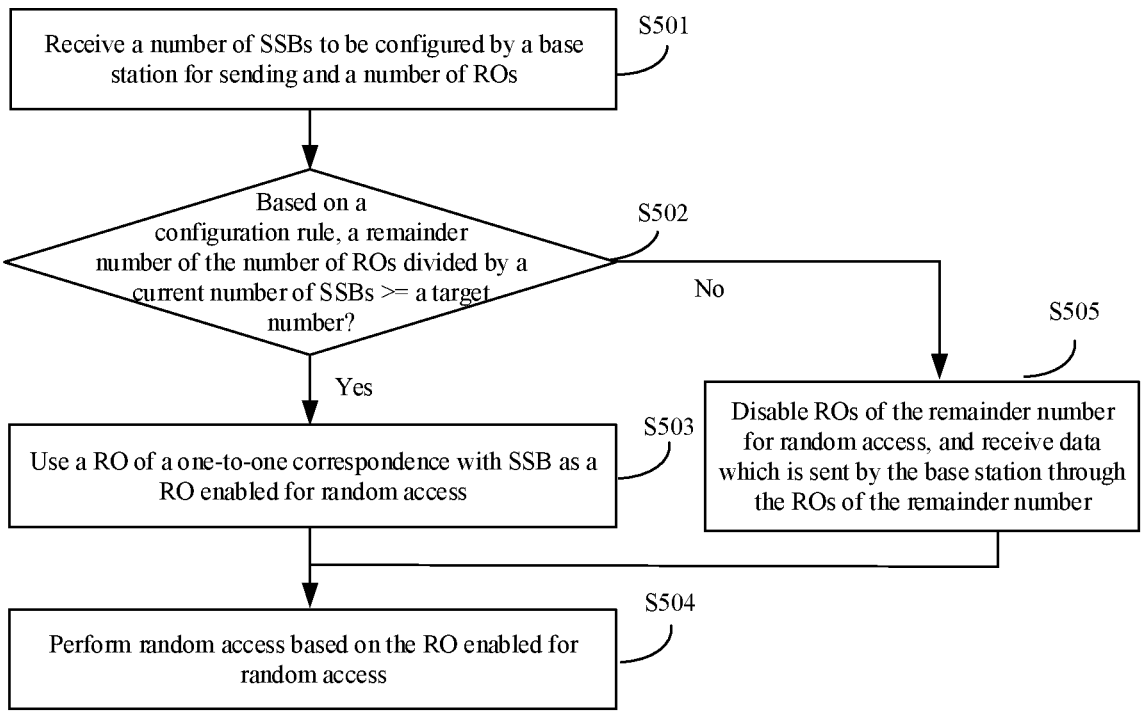
FIG. 6 is a flowchart illustrating another method of random access according to an example of the present disclosure.

FIG. 6 is a flowchart illustrating another method of random access according to an example of the present disclosure. As shown in FIG. 6, the method of random access may further include the following.

At step S505, in response to that the remainder number is less than the target number, ROs of the remainder number is disabled for random access, and data which is sent by the base station through the ROs of the remainder number is received.

In this example, when the remainder number is less than the target number, instead of using the ROs of the remainder number as the ROs enabled for random access, the ROs of the remainder number are used to receive data which is sent by the base station through the ROs of the remainder number, thereby reducing waste of a RO resource and improving data transmission efficiency.

Figure 7:
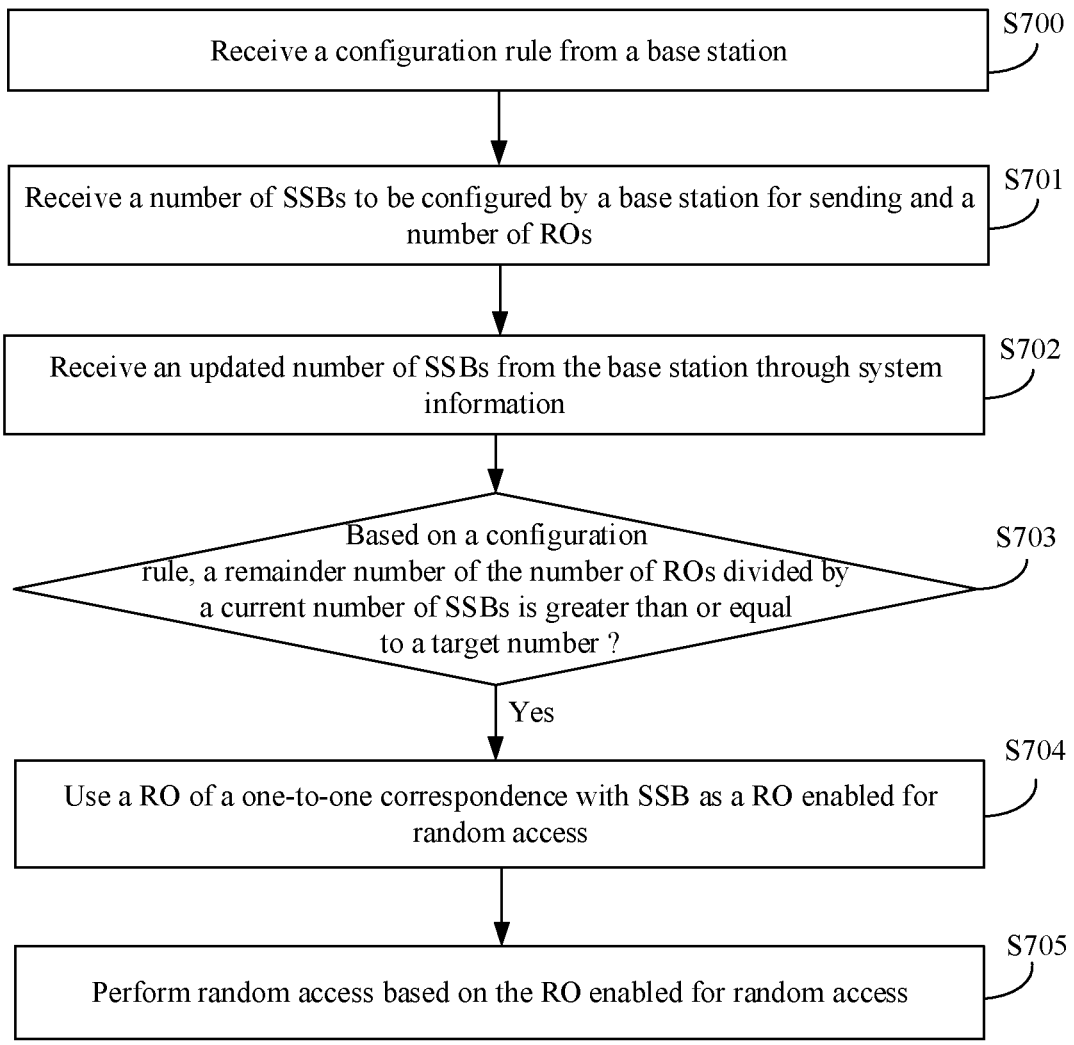
FIG. 7 is a flowchart illustrating another method of random access according to an example of the present disclosure.

FIG. 7 is a flowchart illustrating another method of random access according to an example of the present disclosure, which is described from a UE side. As shown in FIG. 7, the method of random access may further include the followings.

At step S700, the configuration rule from a base station is received, where the configuration rule indicates that: when the remainder number is greater than or equal to the target number, the base station establishes one-to-one correspondences between ROs of the remainder number and SSBs to be configured for sending, and when the remainder number is less than the target number, the base station disables the ROs of the remainder number for random access but sends data through the ROs of the remainder number.

Step S700 may be an optional step. In this example, the configuration rule is received to determine whether the remainder number of the number of ROs divided by the current number of SSBs is greater than or equal to the target number according to the configuration rule, and to determine whether the remaining number of ROs are used as ROs enabled for random access in response to a determination result.

At step S701, a number of SSBs to be configured by a base station for sending and a number of ROs are received.

There is no strict order in which steps S700 and S701 are performed.

At step S702, an updated number of SSBs from the base station is received through system information.

Step S702 may be an optional step. In this example, the updated number of SSBs from the base station is received through the system information, to be informed of the number of SSBs to be configured for sending by the base station.

At step S703, whether a remainder number of the number of ROs divided by a current number of SSBs is greater than or equal to a target number is determined according to a configuration rule, where the target number is determined based on the current number of SSBs.

Optionally, the target number may be equal to half of the current number of SSBs.

At step S704, in response to that the remainder number is greater than or equal to the target number, a RO of a one-to-one correspondence with an SSB is used as a RO enabled for random access.

At step S705, random access is performed based on the RO enabled for random access.

In this example, whether the remainder number of the number of ROs divided by the current number of SSBs is greater than or equal to the target number is determined according to the configuration rule, and the RO of the one-to-one correspondence with the SSB is used as the RO enabled for random access when the remainder number is greater than or equal to the target number, thereby reducing waste of a RO resource and latency of random access.

Figure 8:
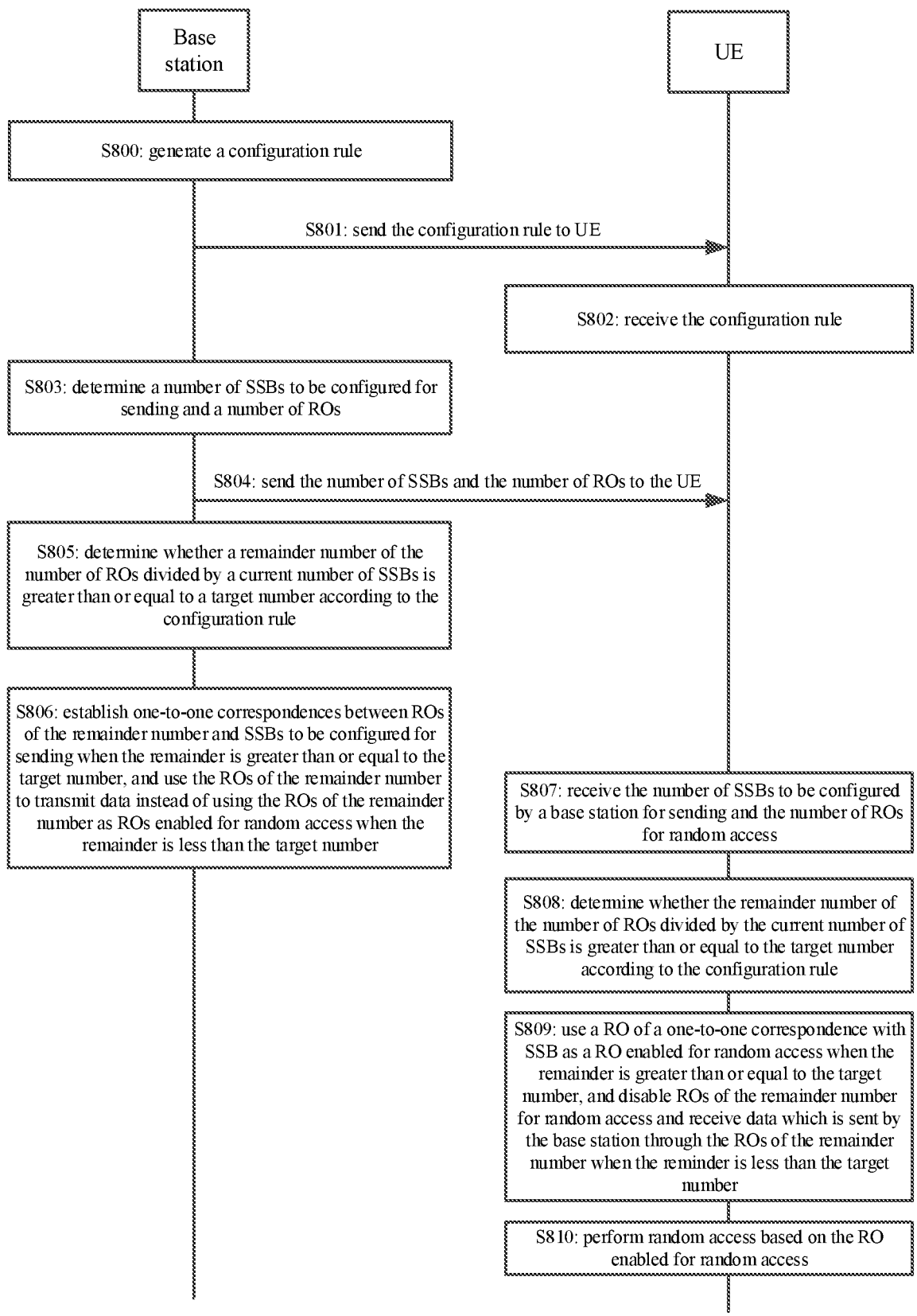
FIG. 8 is a signaling flowchart illustrating a method of random access according to an example of the present disclosure.

FIG. 8 is a signal flowchart illustrating a method of random access according to an example of the present disclosure, which is described from the perspective of interaction between UE and a base station. As shown in FIG. 8, the method of random access may include the followings.

At step 800, the base station generates a configuration rule, where the configuration rule indicates that: when the remainder number is greater than or equal to the target number, the base station establishes one-to-one correspondences between ROs of the remainder number and SSBs to be configured for sending, and when the remainder number is less than the target number, the base station disables the ROs of the remainder number for random access but sends data through the ROs of the remainder number.

At step S801, the base station sends the configuration rule to the UE.

At step S802, the UE receives the configuration rule.

At step S803, the base station determines a number of SSBs to be configured for sending and a number of ROs.

At step S804, the base station sends the number of SSBs and the number of ROs to the UE.

At step S805, the base station determines whether a remainder number of the number of ROs divided by a current number of SSBs is greater than or equal to a target number according to the configuration rule, where the target number is equal to half of the current number of SSBs.

At step S806, when the remainder number of the number of ROs divided by the current number of SSBs is greater than or equal to the target number, the base station establishes one-to-one correspondences between ROs of the remainder number and SSBs to be configured for sending, and when the remainder number is less than the target number, uses the ROs of the remainder number to transmit data instead of using the ROs of the remainder number as ROs enabled for random access.

At step S807, the UE receives the number of SSBs to be configured by the base station for sending and the number of ROs.

At step S808, the UE determines whether the remainder number of the number of ROs divided by the current number of SSBs is greater than or equal to the target number according to the configuration rule.

At step S809, when the remainder number is greater than or equal to the target number, the UE uses a RO of a one-to-one correspondence with an SSB as a RO enabled for random access, when the remainder number is less than the target number, disables ROs of the remainder number for random access, and receives data which is sent by the base station through the ROs of the remainder number.

At step S810, the UE performs random access based on the RO enabled for random access.

In this example, through the interaction between the base station and the UE, the base station can determine whether the remainder number of the number of ROs divided by the current number of SSBs is greater than or equal to the target number according to the configuration rule, and when the remainder number is greater than or equal to the target quantity, the base station can establish one-to-one correspondences between ROs of the remainder number and SSBs to be configured for sending, such that the UE can use the RO of the one-to-one correspondence with the SSB as the RO enabled for random access. Thus, waste of a RO resource and latency of random access are reduced. Also, the UE can disable ROs of the remainder number for random access, and receive data which is sent by the base station through the ROs of the remainder number, thereby reducing the waste of the RO resource and improving data transmission efficiency.

Figure 9A:
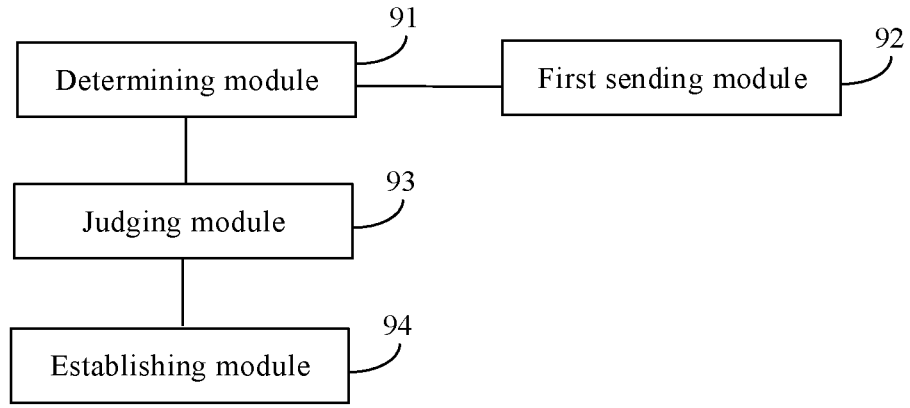
FIG. 9A is a block diagram illustrating an apparatus for configuring a RO according to an example.

FIG. 9A is a block diagram illustrating an apparatus for configuring a RO according to an example, the apparatus may be located in a base station. As shown in FIG. 9A, the apparatus for configuring a RO includes a determining module 91, a first sending module 92, a judging module 93 and an establishing module 94.

The determining module 91 is configured to determine a number of SSBs to be configured for sending and a number of ROs.

The SSB refers to a synchronization signal block or a physical broadcast channel block.

The first sending module 92 is configured to send the number of SSBs and the number of ROs determined by the determining module 91 to UE.

For UE in an initial access state, the first sending module 92 may be configured to send the number of SSBs and the number of ROs to the UE through a CORESET of RMSI.

The judging module 93 is configured to determine whether a remainder number of the number of ROs determined by the determining module 91 divided by a current number of SSBs is greater than or equal to a target number according to a configuration rule, where the target number is determined based on the current number of SSBs.

The configuration rule indicates that: when the remainder number is greater than or equal to the target number, the base station establishes one-to-one correspondences between ROs of the remainder number and SSBs to be configured for sending, and when the remainder number is less than the target number, the base station disables the ROs of the remainder number for random access but sends data through the ROs of the remainder number.

The target number may be determined based on the current number of SSBs. Optionally, the target number may be equal to half of the current number of SSBs.

The establishing module 94 is configured to establish one-to-one correspondences between ROs of the remainder number and SSBs to be configured for sending in response to that the judging module 93 determines the remainder number being greater than or equal to the target number.

If the remainder number is greater than or equal to the target number, the one-to-one correspondences between the ROs of the remainder number and the SSBs to be configured for sending are established. Optionally, the correspondences between the ROs of the remainder number and the SSBs to be configured for sending may be established sequentially.

Assuming that the number of SSBs to be configured for sending is 10 and the number of ROs is 16, then the remainder number is 6. Since the remainder number is greater than the target number, one-to-one correspondences between the 6 ROs and the first 6 SSBs of the 10 SSBs may be established respectively, that is, the 6 ROs can be allocated to the first 6 SSBs of the 10 SSBs, respectively.

In this example, by establishing the one-to-one correspondences between ROs of the remainder number and SSBs to be configured for sending based on whether the remainder number of the number of ROs divided by the current number of SSBs is greater than or equal to the target number according to the configuration rule, the UE can use the RO of a one-to-one correspondence with an SSB as a RO enabled for random access, thereby reducing waste of a RO resource and latency of random access.

Figure 9B:
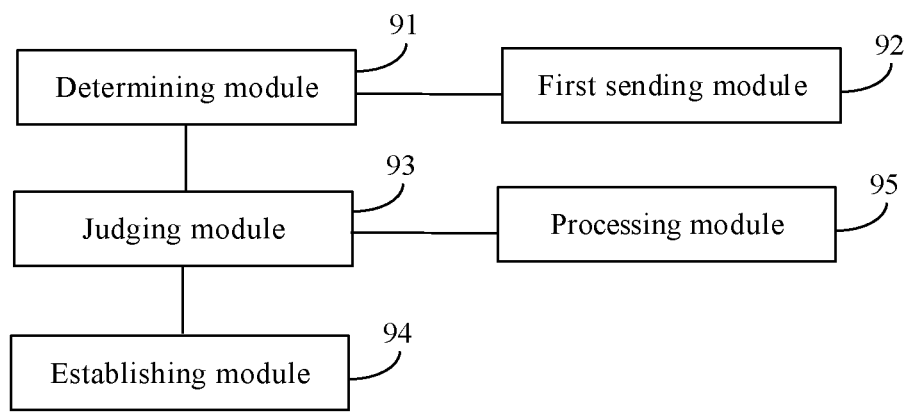
FIG. 9B is a block diagram illustrating another apparatus for configuring a RO according to an example.

FIG. 9B is a block diagram illustrating another apparatus for configuring a RO according to an example. As shown in FIG. 9B, on the basis of the example shown in FIG. 9A, the apparatus may further include: a processing module 95.

The processing module 95 is configured to use the ROs of the remainder number to transmit data instead of using the ROs of the remainder number as ROs enabled for random access in response to that the judging module 93 determines the remainder number being less than the target number.

In this example, when the remainder number is less than the target number, instead of using the ROs of the remainder number as the ROs enabled for random access, the ROs of the remainder number are used to transmit data, thereby reducing waste of a RO resource and improving data transmission efficiency.

Figure 9C:
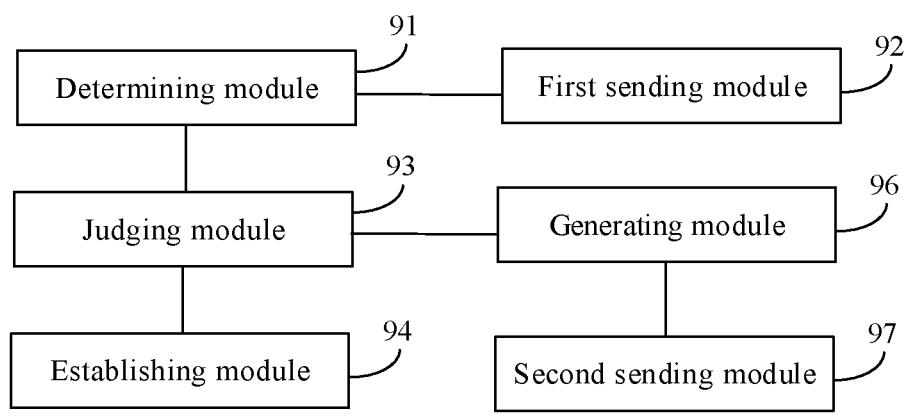
FIG. 9C is a block diagram illustrating another apparatus for configuring a RO according to an example.

FIG. 9C is a block diagram illustrating another apparatus for configuring a RO according to an example. As shown in FIG. 9C, on the basis of the example shown in FIG. 9A, the apparatus may further include: a generating module 96 and a second sending module 97.

The generating module 96 is configured to generate a configuration rule to: when the remainder number is greater than or equal to the target number, establish one-to-one correspondences between ROs of the remainder number and SSBs to be configured for sending; and when the remainder number is less than the target number, disable the ROs of the remainder number for random access but send data through the ROs of the remainder number.

The second sending module 97 is configured to send the configuration rule generated by the generating module 96 to the UE.

In this example, by generating the configuration rule, the base station can determine whether the remainder number of the number of ROs divided by the current number of SSBs is greater than or equal to the target number according to the configuration rule, and determine whether the remaining number of ROs can be used for random access in response to a determination result. By sending the configuration rule to the UE, the UE can also determine whether the remainder number of the number of ROs divided by the current number of SSBs is greater than or equal to the target number according to the configuration rule, and determine whether the remaining number of ROs can be used for random access in response to a determination result.

Figure 9D:
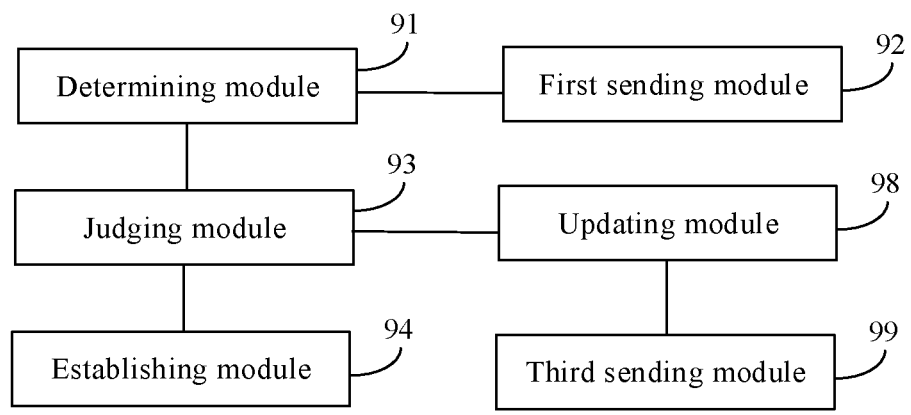
FIG. 9D is a block diagram illustrating another apparatus for configuring a RO according to an example.

FIG. 9C is a block diagram illustrating another apparatus for configuring a RO according to an example, As shown in FIG. 9D, on the basis of the example shown in FIG. 9A, the apparatus may further include: an updating module 98 and a third sending module 99.

The updating module 98 is configured to update the number of SSBs before the determining module 93 determines whether the remainder number of the number of ROs divided by the current number of SSBs is greater than or equal to the target number according to the configuration rule.

The third sending module 99 is configured to send the number of SSBs updated by the updating module 98 to the UE through system information.

In this example, by updating the number of SSBs to be configured for sending, the base station can adjust the number of SSBs to be configured for sending as needed, and send the updated number of SSBs to the UE through the system information, such that the UE can be informed of the number of SSBs to be configured for sending by the base station.

Figure 10A:
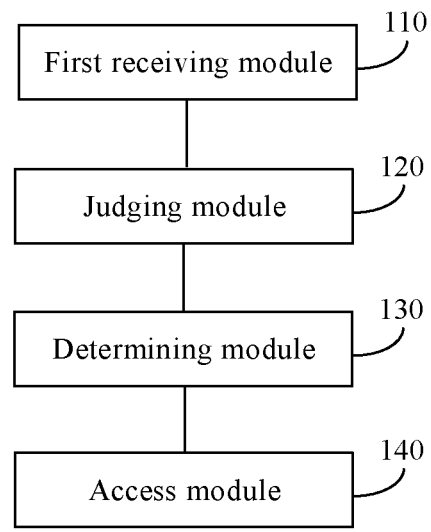
FIG. 10A is a block diagram illustrating an apparatus for random access according to an example.

FIG. 10A is a block diagram illustrating an apparatus for random access according to an example, which may be located in UE. As shown in FIG. 10A, the apparatus for random access includes: a first receiving module 110, a judging module 120, a determining module 130 and an access module 140.

The first receiving module 110 is configured to receive a number of SSBs to be configured by a base station for sending and a number of ROs.

The first receiving module 110 may be configured to receive the number of SSBs and the number of ROs from the base station through a CORESET of RMSI.

The judging module 120 is configured to determine whether a remainder number of the number of ROs received by the first receiving module 110 divided by a current number of SSBs is greater than or equal to a target number according to a configuration rule, where the target number is determined based on the current number of SSBs.

The target number may be determined based on the current number of SSBs. Optionally, the target number may be equal to half of the current number of SSBs.

The determining module 130 is configured to use a RO of a one-to-one correspondence with an SSB as a RO enabled for random access in response to that the judging module 120 determines the remainder number being greater than or equal to the target number.

If the UE determines that the remainder number is greater than or equal to the target number, the RO of the one-to-one correspondence with the SSB is used as the RO enabled for random access, thereby reducing waste of a RO resource and latency of random access.

The access module 140 is configured to perform random access based on the RO enabled for random access which is determined by the determining module 130.

In this example, after determining the RO enabled for random access, the UE may perform random access based on the determined RO.

In this example, whether the remainder number of the number of ROs divided by the current number of SSBs is greater than or equal to the target number is determined according to the configuration rule, and if the remainder number is greater than or equal to the target number, the RO of the one-to-one correspondence with the SSB is used as the RO enabled for random access, and random access is performed based on the RO enabled for random access. Thus, the waste of the RO resource and the latency of random access are reduced, which is conducive to meeting an access requirement of a low-latency service.

Figure 10B:
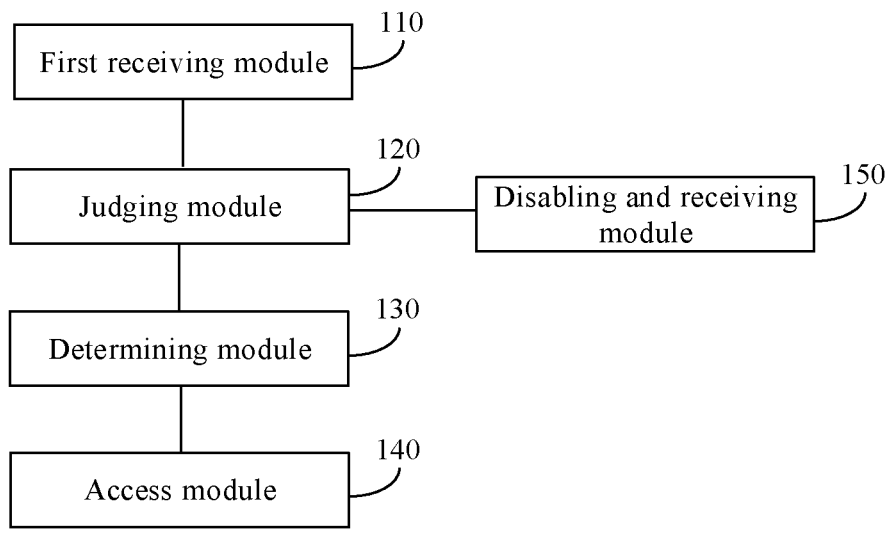
FIG. 10B is a block diagram illustrating another apparatus for random access according to an example.

FIG. 10B is a block diagram illustrating another apparatus for random access according to an example. As shown in FIG. 10B, on the basis of the example shown in FIG. 10A, the apparatus may further include: a disabling and receiving module 150.

The disabling and receiving module 150 is configured to disable ROs of the remainder number for random access and receive data which is sent by the base station through the ROs of the remainder number, in response to that the judging module 120 determines the remainder number being less than the target number.

In this example, when the remainder number is less than the target number, instead of using the ROs of the remainder number as the ROs enabled for random access, the ROs of the remainder number are used to receive data which is sent by the base station through the ROs of the remainder number, thereby reducing waste of a RO resource and improving data transmission efficiency.

Figure 10C:
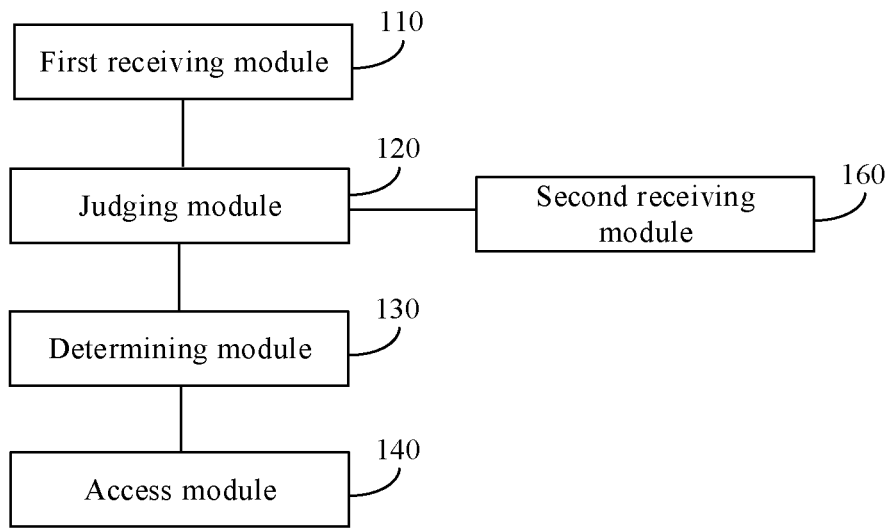
FIG. 10C is a block diagram illustrating another apparatus for random access according to an example.

FIG. 10C is a block diagram illustrating another apparatus for random access according to an example. As shown in FIG. 10C, on the basis of the example shown in FIG. 10A, the apparatus may further include: a second receiving module 160.

The second receiving module 160 is configured to receive the configuration rule from the base station, where the configuration rule indicates that: when the remainder number is greater than or equal to the target number, the base station establishes one-to-one correspondences between ROs of the remainder number and SSBs to be configured for sending, and when the remainder number is less than the target number, the base station disables the ROs of the remainder number for random access but sends data through the ROs of the remainder number.

In this example, the configuration rule is received to determine whether the remainder number of the number of ROs divided by the current number of SSBs is greater than or equal to the target number according to the configuration rule, and to determine whether the remaining number of ROs are used as ROs enabled for random access in response to a determination result.

Figure 10D:
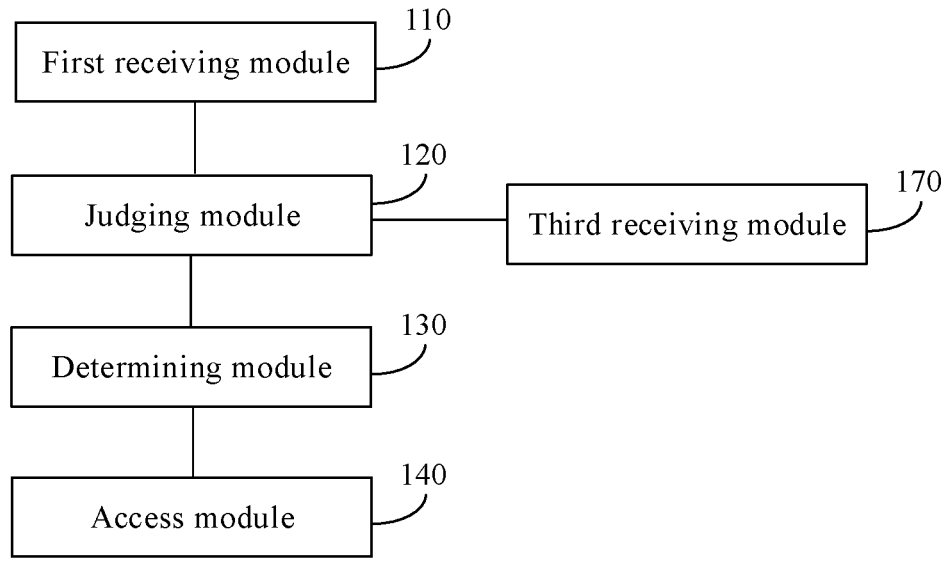
FIG. 10D is a block diagram illustrating another apparatus for random access according to an example.

FIG. 10D is a block diagram illustrating another apparatus for random access according to an example. As shown in FIG. 10D, on the basis of the example shown in FIG. 10A, the apparatus may further include: a third receiving module 170.

The third receiving module 170 is configured to receive an updated number of SSBs from the base station through system information.

In this example, the updated number of SSBs from the base station is received through the system information, to be informed of the number of SSBs to be configured for sending by the base station.

Figure 11:
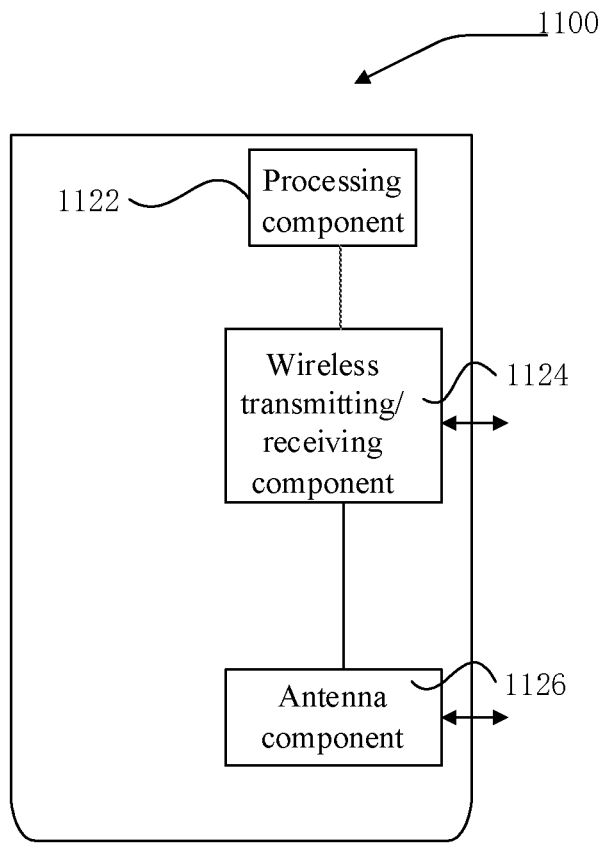
FIG. 11 is a block diagram illustrating an apparatus suitable for configuring a RO according to an example.

FIG. 11 is a block diagram illustrating an apparatus suitable for configuring a RO according to an example. An apparatus 1100 may be provided as a base station. As shown in FIG. 11, the apparatus 1100 includes a processing component 1122, a wireless transmitting/receiving component 1124, an antenna component 1126, and a signal processing part unique to a wireless interface. The processing component 1122 may further include one or more processors.

One of the processors in the processing component 1122 may be configured to:

determine a number of SSBs to be configured for sending and a number of ROs;

send the number of SSBs and the number of ROs to UE;

determine whether a remainder number of the number of ROs divided by a current number of SSBs is greater than or equal to a target number according to a configuration rule, where the target number is determined based on the current number of SSBs; and in response to that the remainder number is greater than or equal to the target number, establish one-to-one correspondences between ROs of the remainder number and SSBs to be configured for sending.

In an exemplary example, there is also provided a non-transitory computer-readable storage medium including instructions. The instructions may be executed by the processing component 1122 of the apparatus 1100 to perform the above method for configuring a RO. For example, the non-transitory computer-readable storage medium may be a Read-Only Memory (ROM), a Random Access Memory (RAM), a CD-ROM, a magnetic tape, a floppy disk, and an optical data storage device and so on.

Figure 12:
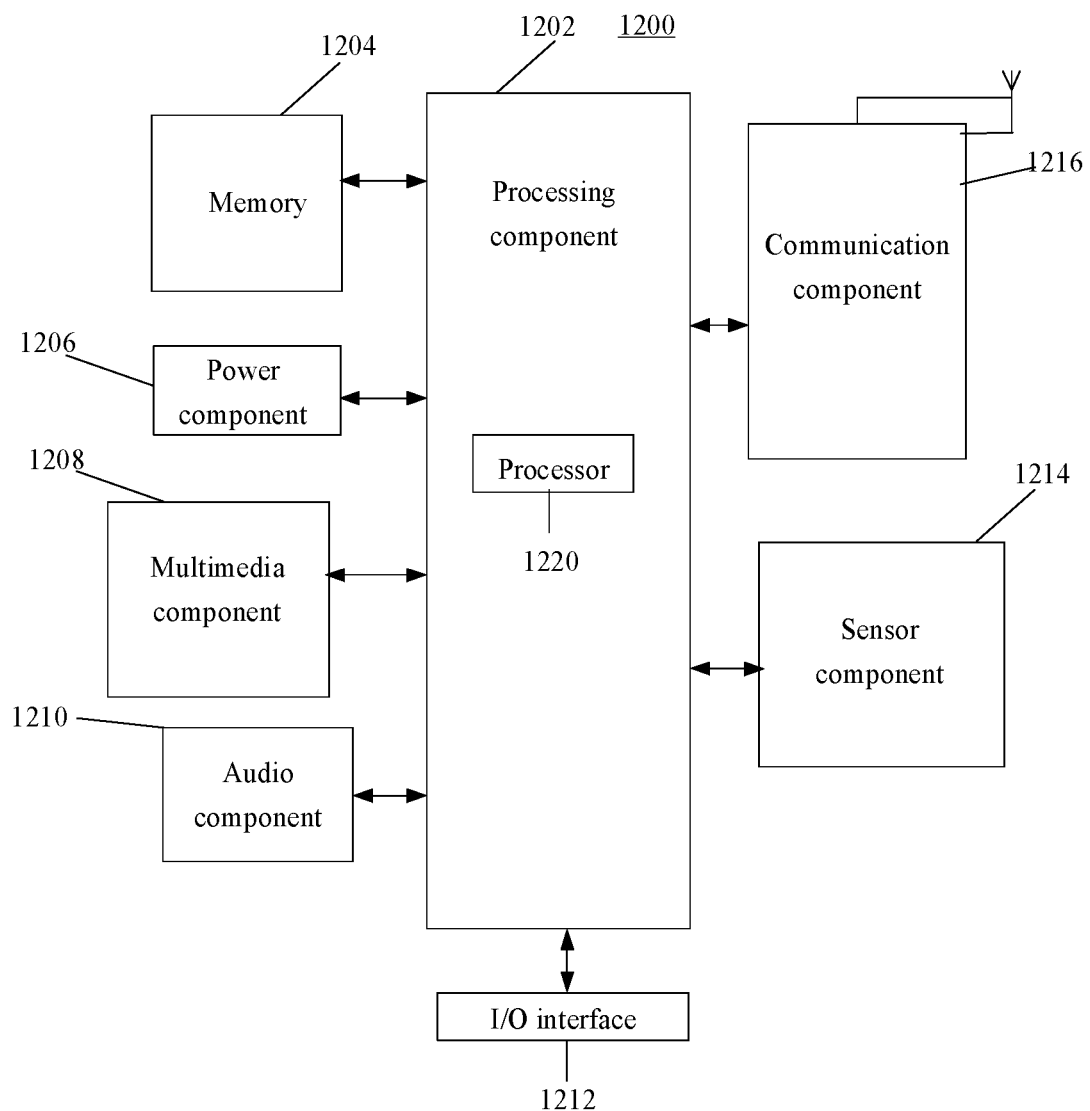
FIG. 12 is a block diagram illustrating an apparatus suitable for random access according to an example.

FIG. 12 is a block diagram illustrating an apparatus suitable for random access according to an example. For example, an apparatus 1200 may be UE, such as a mobile phone, a computer, a digital broadcast terminal, a message receiving and transmitting device, a game console, a tablet device, a medical device, a fitness device, a personal digital assistant, and so on.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls the overall operation of device 1200, such as operations associated with display, telephone calls, data communications, camera operations, and recording operations. The processing component 1202 may include one or more processors 1220 to execute instructions to complete all or part of the steps of the above methods. Moreover, the processing component 1202 can include one or more modules to facilitate interaction between component 1202 and other components. For example, the processing component 1202 may include a multimedia module to facilitate the interaction between the multimedia component 1208 and the processing component 1202.

One the processor 1220 of the processing component may be configured to:

receive a number of SSBs to be configured by a base station for sending and a number of ROs;

determine whether a remainder number of the number of ROs divided by a current number of SSBs is greater than or equal to a target number according to a configuration rule, where the target number is determined based on the current number of SSBs;

in response to that the remainder number is greater than or equal to the target number, use a RO of a one-to-one correspondence with an SSB as a RO enabled for random access; and perform random access based on the RO enabled for random access.

The memory 1204 is to store various types of data to support the operation of the apparatus 1200. Examples of such data include instructions for any application or method operating on device 1200, contact data, phone book data, messages, pictures, videos, and the like. The memory 1204 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power component 1206 provides power to different components of the apparatus 1200. The power component 1206 may include a power management system, one or more power supplies, and other components associated with generating, managing, and distributing power for the apparatus 1200.

The multimedia component 1208 includes a screen providing an output interface between the apparatus 1200 and a user. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensors may not only sense a boundary of a touch or swipe, but also sense a duration and a pressure associated with the touch or swipe. In some examples, the multimedia component 1208 includes a front camera and/or a rear camera. The front camera and/or rear camera may receive external multimedia data when the apparatus 1200 is in an operating mode, such as a photographing mode or a video mode. Each front and rear camera can be a fixed optical lens system or have focal length and optical zoom capabilities.

The audio component 1210 is configured to output and/or input an audio signal. For example, audio component 1210 includes a microphone (MIC) that is configured to receive an external audio signal when device 1200 is in an operational mode, such as a call mode, a recording mode, and a voice recognition mode. The received audio signal may be further stored in memory 1204 or transmitted via communication component 1216. In some examples, audio component 1210 also includes a speaker for outputting an audio signal.

The I/O interface 1212 may provide interfaces between the processing component 1202 and peripheral interface modules. The peripheral interface modules may include a keyboard, a click wheel, buttons and so on. These buttons may include, but are not limited to, a home button, a volume button, a start button, and a lock button.

Sensor component 1214 includes one or more sensors for providing device 1200 with a status assessment of various aspects. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. Sensor component 1214 can include a proximity sensor configured to detect the presence of nearby objects without any physical contact. Sensor component 1214 may also include a light sensor, such as a CMOS or CCD image sensor, for use in imaging applications. In some examples, the sensor component 1214 can also include an acceleration sensor, a gyro sensor, a magnetic sensor, a pressure sensor, or a temperature sensor.

Communication component 1216 is configured to facilitate wired or wireless communication between device 1200 and other devices. The device 1200 can access a wireless network based on a communication standard, such as WiFi, 2G or 3G, or a combination thereof. In an example, the communication component 1216 receives a broadcast signal or broadcast-associated information from an external broadcast management system via a broadcast channel. In an example, the communication component 1216 further includes a Near Field Communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology, and other technologies.

In an example, the apparatus 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory computer-readable storage medium including instructions, such as a memory 1204 including instructions. The above instructions may be executed by the processor 1220 of the apparatus 1200 to complete the above method. For example, the non-transitory computer-readable storage medium may be a Read-Only Memory (ROM), a Random Access Memory (RAM), a CD-ROM, a magnetic tape, a floppy disk, and an optical data storage device and so on.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other implementations of the present disclosure will be readily apparent to those skilled in the art after implementing the disclosure by referring to the specification. The present disclosure is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative.

It is to be understood that this disclosure is not limited to the above described structures shown in the drawings, and various changes and modifications can be made to the disclosure without departing from the scope thereof.

The invention claimed is:

1. A method of configuring a random access occasion (RO), being applied to a base station and comprising:
   determining a current number of synchronization signaling blocks (SSBs) to be configured for sending and a number of ROs;
   sending the current number of SSBs and the number of ROs to user equipment (UE) and dividing the number of ROs by the current number of SSBs to obtain a remainder number;
   determining whether the remainder number is greater than or equal to a target number according to a configuration rule, wherein the target number is determined based on the current number of SSBs; and
   in response to that the remainder number is greater than or equal to the target number, establishing one-to-one correspondences between the remainder number of ROs and the remainder number of SSBs to be configured for sending.

2. The method of claim 1, further comprising:
   in response to that the remainder number is less than the target number, using the remainder number of ROs to transmit data instead of using the remainder number of ROs for random access.

3. The method of claim 1, wherein the target number is equal to half of the current number of SSBs.

4. The method of claim 1, wherein establishing the one-to-one correspondences between the remainder number of ROs and the remainder number of SSBs to be configured for sending comprises:
establishing the one-to-one correspondences between the remainder number of ROs and the remainder number of SSBs to be configured for sending sequentially.

5. The method of claim 1, further comprising:
generating the configuration rule to: establish the one-to-one correspondences between the remainder number of ROs and the remainder number of SSBs when the remainder number is greater than or equal to the target number and disable the remainder number of ROs for random access but send data through the remainder number of ROs when the remainder number is less than the target number; and
sending the configuration rule to the UE.

6. The method of claim 1, further comprising:
updating the current number of SSBs before dividing the number of ROs by the current number of SSBs to obtain the remainder number and determining whether the remainder number is greater than or equal to the target number according to the configuration rule; and
sending the updated number of SSBs to the UE through system information.

7. The method of claim 1, wherein sending the current number of SSBs and the number of ROs to the UE comprises:
sending the current number of SSBs and the number of ROs to the UE through a common control resource set (CORESET) of remaining minimum system information (RMSI).

8. A method of random access, being applied to UE, and comprising:
receiving a current number of SSBs to be configured by a base station for sending and a number of ROs, and dividing the number of ROs by the current number of SSBs to obtain a remainder number;
determining whether the remainder number is greater than or equal to a target number according to a configuration rule, wherein the target number is determined based on the current number of SSBs;
in response to that the remainder number is greater than or equal to the target number, using a RO of a one-to-one correspondence with an SSB as a RO enabled for random access; and
performing random access based on the RO enabled for random access.

9. The method of claim 8, further comprising:
in response to that the remainder number is less than the target number, disabling the remainder number of ROs for random access, and receiving data which is sent by the base station through the remainder number of ROs.

10. The method of claim 8, wherein the target number is equal to half of the current number of SSBs.

11. The method of claim 8, further comprising:
receiving the configuration rule from the base station, wherein the configuration rule comprises:
establishing, by the base station, one-to-one correspondences between the remainder number of ROs and the remainder number of SSBs currently configured for sending when the remainder number is greater than or equal to the target number, and
disabling, by the base station, the remainder number of ROs for random access but sending data through the remainder number of ROs when the remainder number is less than the target number.

12. The method of claim 8, further comprising:
receiving an updated number of SSBs from the base station through system information.

13. The method of claim 8, wherein receiving the current number of SSBs and the number of ROs from the base station comprises:
receiving the current number of SSBs and the number of ROs from the base station through a CORESET of RMSI.

14. A base station, comprising:
a processor; and
a memory for storing instructions executable by the processor,
wherein, the processor is configured to implement the method of configuring the RO according to claim 1.

15. User equipment, comprising:
a processor; and
a memory for storing instructions executable by the processor,
wherein, the processor is configured to:
receive a current number of SSBs to be configured by a base station for sending and a number of ROs, and divide the number of ROs by the current number of SSBs to obtain a remainder number;
determine whether the remainder number of the number of ROs divided by a current number of SSBs is greater than or equal to a target number according to a configuration rule, wherein the target number is determined based on the current number of SSBs;
in response to that the remainder number is greater than or equal to the target number, use a RO of a one-to-one correspondence with an SSB as a RO enabled for random access; and
perform random access based on the RO enabled for random access.

16. The user equipment of claim 15, the processor is further configured to:
in response to that the remainder number is less than the target number, disable the remainder number of ROs for random access, and receive data which is sent by the base station through the remainder number of ROs.

17. The user equipment of claim 15, wherein the target number is equal to half of the current number of SSBs.

18. The user equipment of claim 15, the processor is further configured to:
receive the configuration rule from the base station, wherein the configuration rule comprises:
establishing, by the base station, one-to-one correspondences between the remainder number of ROs and the remainder number of SSBs currently configured for sending when the remainder number is greater than or equal to the target number, and
disabling, by the base station, the remainder number of ROs for random access but sending data through the remainder number of ROs when the remainder number is less than the target number.

19. The user equipment of claim 15, the processor is further configured to:
receive an updated number of SSBs from the base station.

20. The user equipment of claim 15, wherein receiving the current number of SSBs and the number of ROs from the base station comprises:
receiving the current number of SSBs and the number of ROs from the base station through a CORESET of RMSI.

* * * * *